US012646786B2

(12) United States Patent
Hoffmann

(10) Patent No.: US 12,646,786 B2
(45) Date of Patent: Jun. 2, 2026

(54) BATTERY MODULE AND METHOD OF PRODUCING A BATTERY MODULE

(71) Applicant: VARTA Microbattery GmbH, Ellwangen Jagst (DE)

(72) Inventor: Tim Hoffmann, Neresheim (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 616 days.

(21) Appl. No.: 18/021,829

(22) PCT Filed: Jul. 19, 2021

(86) PCT No.: PCT/EP2021/070156

§ 371 (c)(1),
(2) Date: Feb. 17, 2023

(87) PCT Pub. No.: WO2022/037872

PCT Pub. Date: Feb. 24, 2022

(65) Prior Publication Data

US 2023/0395924 A1 Dec. 7, 2023

(30) Foreign Application Priority Data

Aug. 19, 2020 (EP) .................................... 20191725

(51) Int. Cl.
*H01M 50/258* (2021.01)
*H01M 50/264* (2021.01)

(52) U.S. Cl.
CPC ....... *H01M 50/258* (2021.01); *H01M 50/264* (2021.01)

(58) Field of Classification Search
None
See application file for complete search history.

(56) References Cited

U.S. PATENT DOCUMENTS

2002/0093246 A1 7/2002 Takahashi
2013/0260190 A1 10/2013 Sato

FOREIGN PATENT DOCUMENTS

CA 2659034 A1 9/2009
CN 201550978 U 8/2010
(Continued)

OTHER PUBLICATIONS

Machine translation DE102011075044 (Year: 2011).*

(Continued)

*Primary Examiner* — Wyatt P McConnell

(74) *Attorney, Agent, or Firm* — DLA Piper LLP (US)

(57) ABSTRACT

A battery includes a first battery module having a housing having at least one first marginal indentation on a housing exterior, and a second battery module having a housing having at least one second marginal indentation on a housing exterior, wherein the at least one connecting element holding the battery modules together includes a first end piece and a second end piece and a middle piece connecting the two end pieces, the first end piece is in the form of a holding means and form-fittingly engages in the first marginal indentation of the first battery module, the second end piece is in the form of a holding means and form-fittingly engages in the second marginal indentation of the second battery module, and introduced into the middle piece of the connecting element is an expansion means that expands the connecting element or the middle piece connecting the two end pieces.

16 Claims, 6 Drawing Sheets

(56) References Cited

FOREIGN PATENT DOCUMENTS

| CN | 103262293 A | 8/2013 |
| CN | 107863465 A | 3/2018 |
| DE | 10 2011 075 044 A1 | 11/2012 |
| EP | 2461049 A1 | 6/2012 |
| JP | 2011134554 A | 7/2011 |
| KR | 2017-0051817 A | 5/2017 |

OTHER PUBLICATIONS

Machine translation KR20170051817 (Year: 2017).*
International Search Report dated Oct. 15, 2021 in counterpart
International Application No. PCT/EP2021/070156 w/English trans-
lation.
Written Opinion dated Oct. 15, 2021 in counterpart International
Application No. PCT/EP2021/070156.
Office Action dated Jul. 29, 2025, from counterpart Japanese
Application No. 2023-512064.
Office Action dated Jan. 1, 2026, from counterpart Chinese Appli-
cation No. 202180043778.9.

* cited by examiner

BATTERY MODULE AND METHOD OF PRODUCING A BATTERY MODULE

TECHNICAL FIELD

This disclosure relates to a battery comprising at least two battery modules and to a method of producing such a battery.

BACKGROUND

A battery is an electrical energy store made of a plurality of electrochemical energy storage cells. Larger batteries are usually composed of battery modules that can comprise either individual energy storage cells or multiple energy storage cells connected to one another. The number of energy storage cells comprised by a battery module depends on whatever are the required currents and voltages. For electromobility applications or for large stationary energy stores, very large currents and high voltages are generally required.

Each electrochemical energy storage cell comprises at least one positive and at least one negative electrode, which electrodes are separated from one another by a separator. What occurs in electrochemical energy storage cells is an electrochemical, energy-providing reaction which is composed of two partial reactions that are electrically coupled to one another but are spatially separated from one another. A partial reaction occurring at a comparatively lower redox potential takes place at the negative electrode. The other partial reaction takes place at the positive electrode at a comparatively higher redox potential. During discharge, electrons are released at the negative electrode as a result of an oxidation process, resulting in a flow of electrons via an external load to the positive electrode, from which a corresponding quantity of electrons is absorbed. A reduction process thus occurs at the positive electrode. At the same time, an ion current corresponding to the electrode reaction occurs within the electrochemical energy storage cell for the purpose of charge equalization. This ion current passes through the separator and is ensured by an ion-conducting electrolyte.

In secondary (rechargeable) electrochemical energy storage cells, this discharge reaction is reversible, and so there is the possibility of reversing the conversion of chemical energy into electrical energy that occurred during the discharge.

An electrochemical energy storage cell often used in battery modules is the lithium-ion cell. It comprises electrodes which can reversibly absorb and re-release lithium ions, and also an electrolyte containing lithium ions.

Various designs are known for electrochemical energy storage cells, including lithium-ion cells. Besides prismatic shapes, button cells and cylindrical cells are widespread. Both button cells and cylindrical cells have a circular base. Cylindrical cells differ from button cells in that button cells have a height that is less than their diameter. By contrast, cylindrical cells have a height greater than their diameter. In battery modules of the type mentioned above, prismatic cells or cylindrical cells are commonly used. Use of the latter can be advantageous in respect of cooling the energy storage cells since cooling media can circulate in the spaces between adjacent cylindrical cells.

Battery modules often have a cubic housing with a rectangular top side and a rectangular bottom side and four rectangular side walls. When assembling the battery modules to form a battery, the battery modules are generally aligned side by side so that they can then be interconnected accordingly. The correct positioning and orientation of the individual battery modules, the alignment thereof and the fine adjustment when assembling the battery modules is generally done manually and is comparatively complex and labor-intensive.

DE 102011075044 A1 discloses battery components mechanically connected to one another via form-fitting plug connections.

KR 20170051817 A discloses coupling-type connecting elements which engage in marginal indentations of side-by-side battery modules or the like. The connecting elements are each fixed with two screws.

US 2002/0093246 A1 discloses a connecting element intended for connecting battery components.

It could therefore be helpful to simplify and improve joining and assembly of individual battery modules to form a battery, particularly, by combining the battery modules that can be realized such that easy and practical handling is possible and accidental misassembly is ideally also avoided.

SUMMARY

I provide a battery including at least two battery modules held together via at least one connecting element, the battery including a first battery module having a housing having at least one first marginal indentation on a housing exterior, and a second battery module having a housing having at least one second marginal indentation on a housing exterior, wherein the at least one connecting element holding the battery modules together includes a first end piece and a second end piece and a middle piece connecting the two end pieces, the first end piece is in the form of a holding means and form-fittingly engages in the first marginal indentation of the first battery module, the second end piece is in the form of a holding means and form-fittingly engages in the second marginal indentation of the second battery module, introduced into the middle piece of the connecting element is an expansion means that expands the connecting element or the middle piece connecting the two end pieces.

I also provide a method of producing a battery having at least two battery modules, including providing a first battery module having a housing having at least one first marginal indentation on a housing exterior, providing a second battery module having a housing having at least one second marginal indentation on a housing exterior, and providing at least one connecting element having a first end piece and a second end piece and a middle piece connecting the two end pieces, wherein the first battery module and the second battery module are aligned such that the housing exteriors of the battery modules having the marginal indentations are aligned parallel to one another and the first marginal indentation of the first battery module and the second marginal indentation of the second battery module lie side by side, the connecting element is inserted into the side-by-side marginal indentations of the first battery module and the second battery module such that the first end piece of the connecting element engages in the first marginal indentation of the first battery module and the second end piece of the connecting element engages in the second marginal indentation of the second battery module, and after the connecting element has been inserted into the side-by-side marginal indentations of the battery modules, a spreading means is inserted into the middle piece of the connecting element to expand the connecting element.

DETAILED DESCRIPTION

Figure 1:
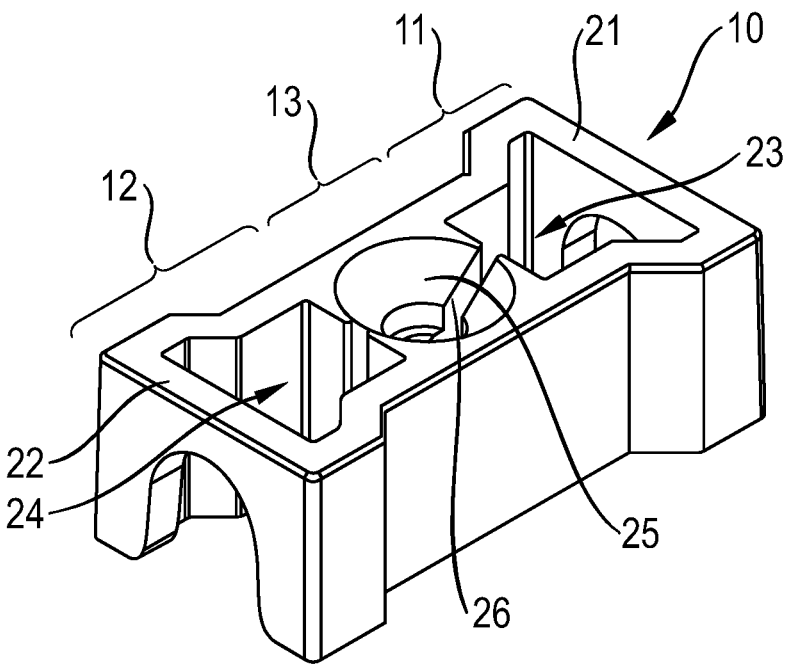
FIG. 1 shows an isometric oblique view from above of a first preferred example of a connecting element.

My battery comprises at least two battery modules held together via at least one connecting element. The battery is always distinguished by:
- a. A first battery module of the battery has a housing having at least one first marginal indentation on a housing exterior.
- b. A second battery module of the battery has a housing having at least one second marginal indentation on a housing exterior.
- c. The at least one connecting element holding the battery modules together comprises a first end piece and a second end piece and a middle piece connecting the two end pieces.
- d. The first end piece is in the form of a holding means and preferably form-fittingly engages in the first marginal indentation of the first battery module.
- e. The second end piece is in the form of a holding means and preferably form-fittingly engages in the second marginal indentation of the second battery module.

The assembly of two side-by-side battery modules by one or more connecting elements that engage in corresponding marginal indentations on the housing exteriors of the battery modules and couple the battery modules to one another allows, first, assembly of a battery that is very simple to carry out and, at the same time, highly precise and error-free. Second, this can provide battery modules in a battery that are very precisely adjusted and securely connected to one another, with subsequent removal or addition of further battery modules also being possible without any problems.

The connecting element engages in two side-by-side indentations in the housing exteriors of adjacent battery modules and, in doing so, couples the battery modules to one another. The end pieces of the connecting element and the indentations in the respective housing exteriors of the battery modules fit together like a key and lock. The end pieces of the connecting element and the indentations in the housing exteriors of the side-by-side battery modules are preferably designed as mirror images.

In this way, two modules, and preferably also more battery modules, can be fitted to one another. For example, 10 or more, in particular 20 or more, for example, 25, battery modules can be stably joined together in this way to form a battery.

Like the modules described in the Background section, my battery modules of the battery comprise either individual energy storage cells or multiple energy storage cells connected to one another. The energy storage cells are preferably lithium-ion cells.

Preferably, multiple connecting elements can be provided per side of the battery module, for example, two connecting elements distributed over the length of the side of the battery module. This can achieve a particularly stable connection of the battery modules to one another.

The housing exteriors of the battery modules are preferably planar and more preferably only have depressions that are not a hindrance when handling and especially when inter-connecting the battery modules.

Particularly preferably, the battery is distinguished by a. and b.:
- a. The housing exteriors of the battery modules having the marginal indentations are aligned parallel to one another and directly adjoin one another.
- b. The first marginal indentation comprises at least one undercut which interacts with the first end piece in the form of a holding means.
- c. The second marginal indentation comprises at least one undercut which interacts with the second end piece in the form of a holding means.
- d. Between the first battery module and the at least one connecting element and between the second battery module and the at least one connecting element, there is a form fit perpendicular to the parallel housing exteriors of the battery modules.
- a. to d. immediately above are preferably realized in combination with one another.

The system of marginal indentations on the housing exteriors of the battery modules in conjunction with the connecting elements correspondingly inserted into the indentations optimally solves the alignment and the mechanical parallel connection of the battery modules.

The undercuts can particularly advantageously establish the form fit between the battery modules and the respective end piece. In particular, this avoids, in a mirror-image design of the connecting elements, the possibility of the connecting elements slipping out of the marginal indentations of the battery modules in the lateral direction. The connecting element is inserted into the marginal indentations of the battery modules and fixes them to one another.

Particularly preferably, the connecting element is distinguished by at least one of:
- a. The first end piece and the second end piece of the connecting element differ in their size.
- b. The first end piece and the second end piece of the connecting element differ in their shape.

As a result of the two end pieces of a connecting element being configured differently, what is achieved is that the connecting element can be inserted in only one orientation into the indentations in the housing exteriors of the side-by-side battery modules, which indentations are of a corresponding mirror-image design and thus differ. This rules out incorrect joining and assembly of the battery modules. Since the connecting element only fits if two indentations in the housing exteriors of adjacent battery modules lie directly side by side, correct alignment of the battery modules with one another is ensured. For example, this rules out accidental polarity reversal.

Particularly preferably, the battery is distinguished by:
- a. The first end piece and/or the second end piece of the connecting element have a dovetail-like cross section.
- b. The connecting element is connected to the first and the second battery module via a dovetail connection.

The dovetail connection is a particularly efficient shape for rigidly and form-fittingly binding the connecting element and the battery modules to one another.

Also possible in principle are other shapes of the end pieces of the connecting element, and as a mirror image in the indentations on the housing exteriors of the battery modules, for example, in the manner of an undercut.

Particularly advantageously, the battery is distinguished by the additional structure in respect of the configuration of the connecting element:

a. The first end piece and/or the second end piece of the connecting element are each formed by an encircling web.

The encircling web is preferably realized both in the first end piece and in the second end piece of a connecting element.

In the configuration of the connecting element with encircling webs for forming the end pieces, what can be achieved, first, is a very stable design of the connecting element. Secondly, the configuration of the end pieces as encircling webs offers the particular advantage that this realizes a central recess in each of the end pieces of the connecting element, which offers particular advantages for the further preferred configurations described below.

Furthermore, in preferred configurations, the first and/or second end piece of the connecting element can have recesses for engaging a manipulation means. With the aid of a manipulation means, for example, a handy tool such as a screwdriver or the like, the connecting element can also be taken out again after the battery has been assembled by lifting it out so to speak by engagement in the recesses.

Very particularly advantageously, the recesses can be realized according to:

a. The first end piece and/or the second end piece of the connecting element are each formed by an encircling web having a top side and a bottom side and the recesses are arcuate recesses on the bottom side of the webs.

Owing to the arcuate recesses on the bottom side of the webs which form the end pieces of the connecting element, a way of engagement for optionally taking out the connecting element again after fitting thereof is provided in a particularly simple to realize manner.

In a very particularly preferred configuration of the battery, at least one of the additional structure is provided in respect of the connecting element:

a. Introduced into the middle piece of the connecting element is an expansion means for expanding the connecting element, in particular the middle piece connecting the two end pieces.

b. The middle piece of the connecting element has a gap in the longitudinal direction of the connecting element.

Preferably, a. and b. immediately above are realized together. Introduction of the expansion means makes it possible to expand the middle piece along the gap. Preferably, the gap cuts through the middle piece over its entire length, with the gap then preferably opening into the central recesses of the end pieces, which are preferably formed by the encircling webs of the end pieces.

The introduction of an expansion means and a thus achievable expansion of the connecting element makes it possible for the connecting element, after its insertion into the indentations of the battery module, to be subsequently fixed in a particularly stable and reliable manner, and so this can achieve a particular stability of the assembled battery modules in their relative position to one another. Owing to the expansion, the connecting element remains in its position in a particularly secure manner and can no longer fall out.

The expansion means for expanding the connecting element is particularly advantageously a screw, in particular a self-tapping countersunk screw, which, with the aid of a correspondingly provided threaded socket in the middle piece of the connecting element, can be screwed into the middle piece after the connecting element has been inserted. The particular advantage of the countersunk screw is that it can also be readily taken out again, if required, using the simple tool of a screwdriver to cancel the expansion of the connecting element, and so the connecting element can also be taken out again. An alternative for an expansion means is, for example, a conical pin that can be inserted accordingly.

Especially in connection with the expandability of the connecting element, the battery is preferably distinguished by at least one of additional structures in respect of a corresponding configuration of the indentations of the battery modules:

a. The first marginal indentation of the first battery module and/or the second marginal indentation of the second battery module each have a side wall and a base.

b. The base of the first marginal indentation and/or the second marginal indentation comprises an elevation spaced from the side wall.

c. The elevation is designed for preferably form-fitting engagement in the first end piece and/or in the second end piece of the connecting element.

Particular preference is given to implementation of a. to c. immediately above in combination.

Preferably, both the indentation of the first battery module and the indentation of the adjacent second battery module are provided with such an elevation spaced from the side wall and designed for preferably form-fitting engagement in the respective end piece.

The basis of this particularly advantageous configuration is that the stated expansion of the connecting element is preferably associated with a shortening of the connecting element since the end pieces thereof are pulled together as a result of the expansion. Since the connecting element is form-fittingly connected to the first battery module and to the second battery module, they are also pulled together as a result. In this configuration of the battery, the side-by-side battery modules brace one another to a certain extent as a result of the expansion of the connecting elements, thereby improving the stability of the assembled battery modules.

The connecting element can particularly advantageously consist of plastic. Plastic has the particular advantage that it can readily ensure the required stability and flexural strength for the connecting element. Moreover, plastic is available very inexpensively and is easy to process. Furthermore, the low weight of plastic is advantageous, the overall weight of the resulting battery not being significantly influenced by the plastic connecting elements.

Furthermore, plastic has the advantage that the required flexibility of the connecting element is, for example, also readily provided in respect of expansion of the connecting element. Moreover, a self-tapping countersunk screw can, for example, also be inserted into a plastic connecting element without any difficulty since the plastic material is sufficiently soft for this purpose.

Various types of plastic that are widespread are suitable as the plastic for the connecting element. For example, polycarbonates or the like can be used. Polycarbonate/acetonitrile butadiene styrene (PC/ABS) is particularly suitable since this blend of polycarbonate and acetonitrile butadiene styrene combines very good processability of the material with outstanding mechanical properties.

Particularly advantageously, a relevant plastic connecting element can be manufactured as an injection-molded part. Injection molding, as a very common manufacturing process, allows the required shaping of the connecting element in a very cost-effective and adaptable manner. Furthermore, such injection-molded parts can be readily mass-produced.

The housing of the battery modules can particularly advantageously be made of plastic. The advantage of plastic as the material for the housing of the battery modules lies in the low weight of plastic, the good processability thereof, the flexible design possibilities and the electrically insulating material properties.

I also provide the above-described connecting element for connecting the battery modules and the battery modules having the at least one marginal indentation for engaging a mirror-imagedly designed end piece of a corresponding connecting element, as described above. With regard to preferred features of the connecting element and of the battery modules and to the associated advantages, reference is made to the above description.

I further provide a method of producing a battery comprising at least two battery modules. The method is characterized by:

a. Providing a first battery module which has a housing having at least one first marginal indentation on a housing exterior.

b. Providing a second battery module which has a housing having at least one second marginal indentation on a housing exterior.

c. Providing at least one connecting element having a first end piece and a second end piece and a middle piece connecting the two end pieces.

d. The first battery module and the second battery module are aligned such that the housing exteriors of the battery modules having the marginal indentations are aligned parallel to one another and that the first marginal indentation of the first battery module and the second marginal indentation of the second battery module lie side by side.

e. The connecting element is inserted into the side-by-side marginal indentations of the first battery module and the second battery module such that the first end piece of the connecting element engages in the first marginal indentation of the first battery module and that the second end piece of the connecting element engages in the second marginal indentation of the second battery module.

Very particularly preferably, the method is further distinguished by adding:

a. After the connecting element has been inserted into the side-by-side marginal indentations of the battery modules, a spreading means is inserted into the middle piece of the connecting element to expand the connecting element.

With regard to the further steps of the method, in particular in respect of the configuration of the connecting element and the configuration of the corresponding indentations of the battery modules, reference is made to the above-described examples and the associated advantages.

By the method, the reliable, stable and correct assembly of two or more battery modules to form one battery can be achieved in a particularly simple manner.

In particular, the preferably provided differing shape and/or size of the end pieces of the connecting elements can ensure that a polarity reversal of the battery modules can occur. This is avoided by the connecting elements only fitting in a correct position.

Overall, the method allows correct alignment and mechanical parallel connection when assembling the battery modules and automatic fine adjustment without the need to perform subsequent manual alignment of the battery modules. Moreover, owing to the preferably provided spreadability of the connecting elements and the fact that this is associated with the side-by-side battery modules pulling together, what is achieved is bracing and thus a particularly good stability of the assembled battery modules.

A further particular advantage of the method is that the connecting element(s) can subsequently also be taken out again to be able to replace individual battery modules or possibly all battery modules.

Depending on the dimensions of the battery modules to be assembled and depending on the dimensions of the battery, the dimensions of the connecting elements and the corresponding indentations in the housing exteriors of the battery modules can also be adjusted. In customary battery modules that have, for example, dimensions of 255*170*195 (length*width*height, each in [mm]) or of 329*80*226 (length*width*height, each in [mm]), what can be provided, for example, are connecting elements having a length of about 1 to 5 cm, preferably a length of between 2 and 3 cm and, for example, a width of between 0.5 and 1.5 cm. The width of the connecting element in the middle piece can preferably be between 8 and 10 mm and the width at the ends of the end pieces can preferably be between 12 and 15 mm. As explained, it is particularly advantageous if the two end pieces of a connecting element differ in their size and/or shape. For example, one end piece can have a width between 12 and 13 mm and the opposing end of the other end piece can have, for example, a width between 14 and 15 mm. In principle, the corresponding indentations on the housing exteriors of the battery modules are of mirror-image design, it being possible to provide a certain degree of play in the dimensions to facilitate the insertion of the connecting element into the indentations.

Further features and advantages will be apparent from the examples described below in conjunction with the drawings. The individual features can each be realized individually or in combination with one another.

FIG. 1 shows a first example of a connecting element 10 which is intended for connecting two side-by-side battery modules to form a battery. The connecting element 10 comprises a first end piece 11, a second end piece 12, and a middle piece 13 lying in between. The end pieces 11 and 12 have a dovetail-like cross section, the terminal width of the first end piece 11 being somewhat larger than that of the second end piece 12. The first end piece 11 and the second end piece 12 are formed by an encircling web 21 and an encircling web 22, respectively, the webs 21 and 22 each defining a central recess 23, 24 in the end pieces 11 and 12.

The middle piece 13 has a central, tapering depression 25 having the socket of an internal thread. The depression 25 is intended for introduction of a self-tapping countersunk screw (not depicted here). To this end (separately from the specific example according to FIG. 1), the depression can optionally also comprise an internal thread. Furthermore, provided in the longitudinal direction of the middle piece 13 is a central gap 26 which facilitates width expansion of the connecting element 10 when introducing the countersunk screw or a comparable expansion means.

Figure 2:
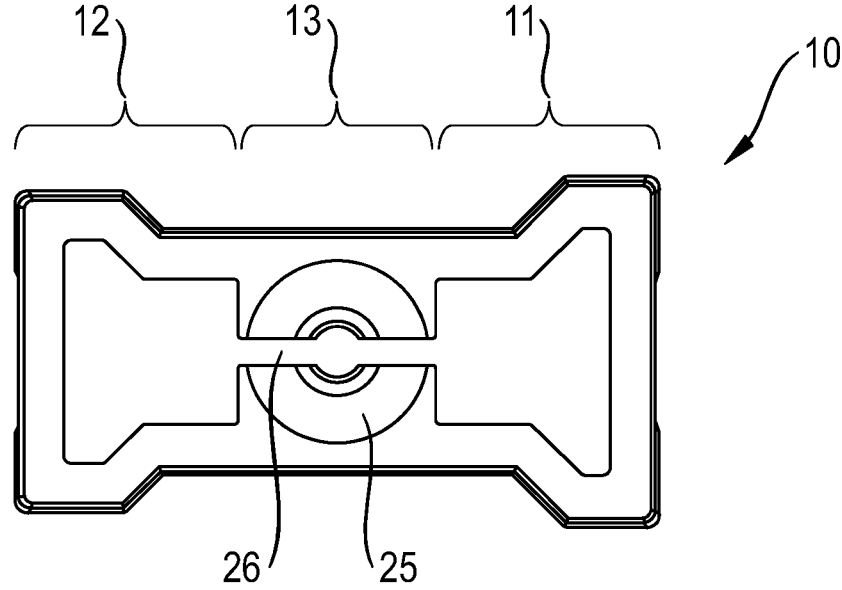
FIG. 2 shows a top view of the connecting element from FIG. 1.

FIG. 2 shows a top view of the connecting element 10 from FIG. 1. What can be seen here is the greater width of the dovetail-like end piece 11 in comparison with the opposite end piece 12. This unequal configuration of the end pieces 11 and 12 ensures battery modules are correctly positioned when they are assembled since correspondingly mirror-imaged configurations of the indentations provided in the housing exteriors of the battery modules mean that only one orientation of the battery modules is possible, since the connecting element 10 only fits when the battery modules are correctly positioned.

Figure 3:
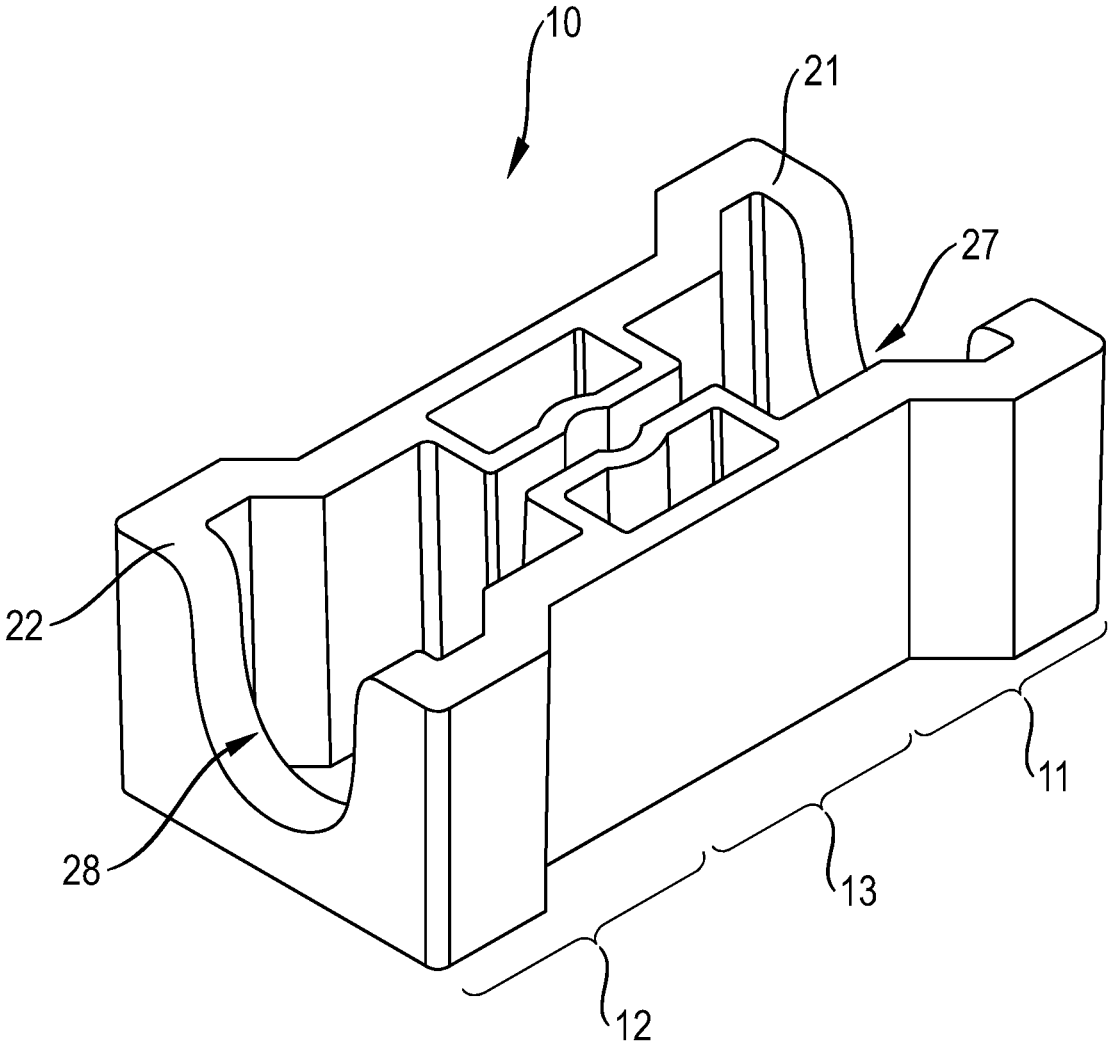
FIG. 3 shows an isometric oblique view from below of the connecting element from FIG. 1.

FIG. 3 shows an oblique view from below of the connecting element 10 from FIG. 1. On the bottom side of the webs 21 and 22 forming the end pieces 11 and 12, which bottom side is visible here, what is provided is an arcuate recess 27 and 28, respectively. When the connecting element 10 has been inserted after the battery has been assembled, a manipulation means, for example, a screwdriver can be applied with the aid of the recesses. With the aid thereof, the connecting element 10 can, so to speak, be lifted out again from the corresponding indentations in the housings of the battery modules to release the connection.

Figure 4:
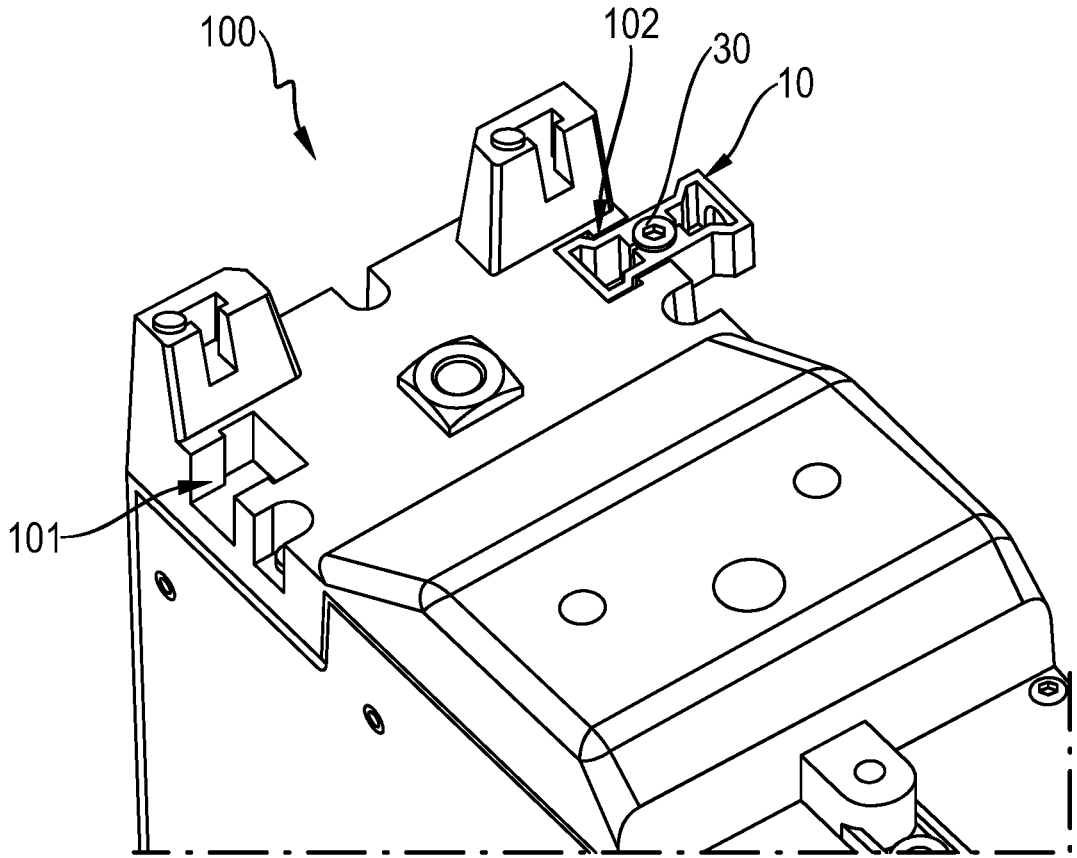
FIG. 4 shows an oblique view from above of the housing of a battery module with attachment of a connecting element (detail).

FIG. 4 shows a detail of the top side of a battery module 100 which has two marginal indentations 101 and 102 on opposite sides in the housing on the top side of the battery module 100. The indentations 101 and 102 are designed as mirror images of the end pieces of the connecting element 10, and so the end pieces of two connecting elements 10 (only one connecting element 10 is shown here) can engage in the marginal indentations 101 and 102 and can thus form a form-fitting holding means for connection of side-by-side battery modules 100.

Furthermore, FIG. 4 depicts a countersunk screw 30 or the screw head thereof that has been screwed into the conical depression 25 in the middle piece 13 of the connecting element 10. As a result of the sinking of the countersunk screw 30 in the connecting element 10, the legs forming the outer edge of the middle piece 13 are pressed apart or expanded such that the connecting element 10 is anchored particularly firmly and stably in the corresponding indentations on the housing exterior of the battery module 100 and a particularly stable connection of side-by-side battery modules 100 is thus possible.

Figure 5:
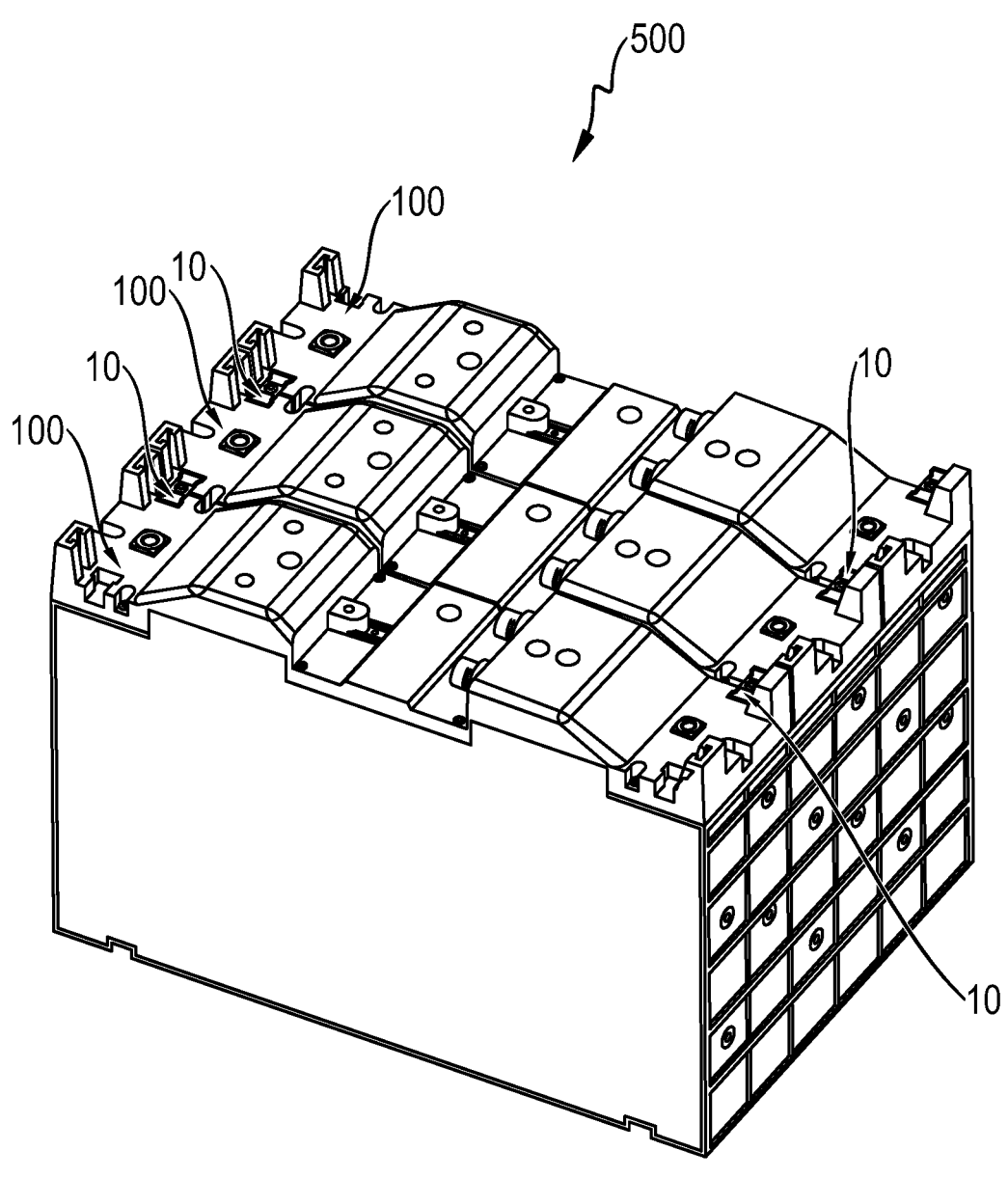
FIG. 5 shows an oblique view from above of three battery modules which have been joined together to form a battery using connecting elements.

FIG. 5 shows three side-by-side battery modules 100 which are held together by the connecting elements 10. Two connecting elements 10 are provided on each longitudinal side of the battery module 100. The housing exteriors of the battery modules lie parallel to one another and directly adjoin one another, and the two connecting elements 10 intended for coupling two battery modules 100 to one another engage in the corresponding indentations 101 and 102 on the housing exterior of the battery modules 100. The battery modules 100 which are coupled to one another or held together form the battery 500.

Figure 6:
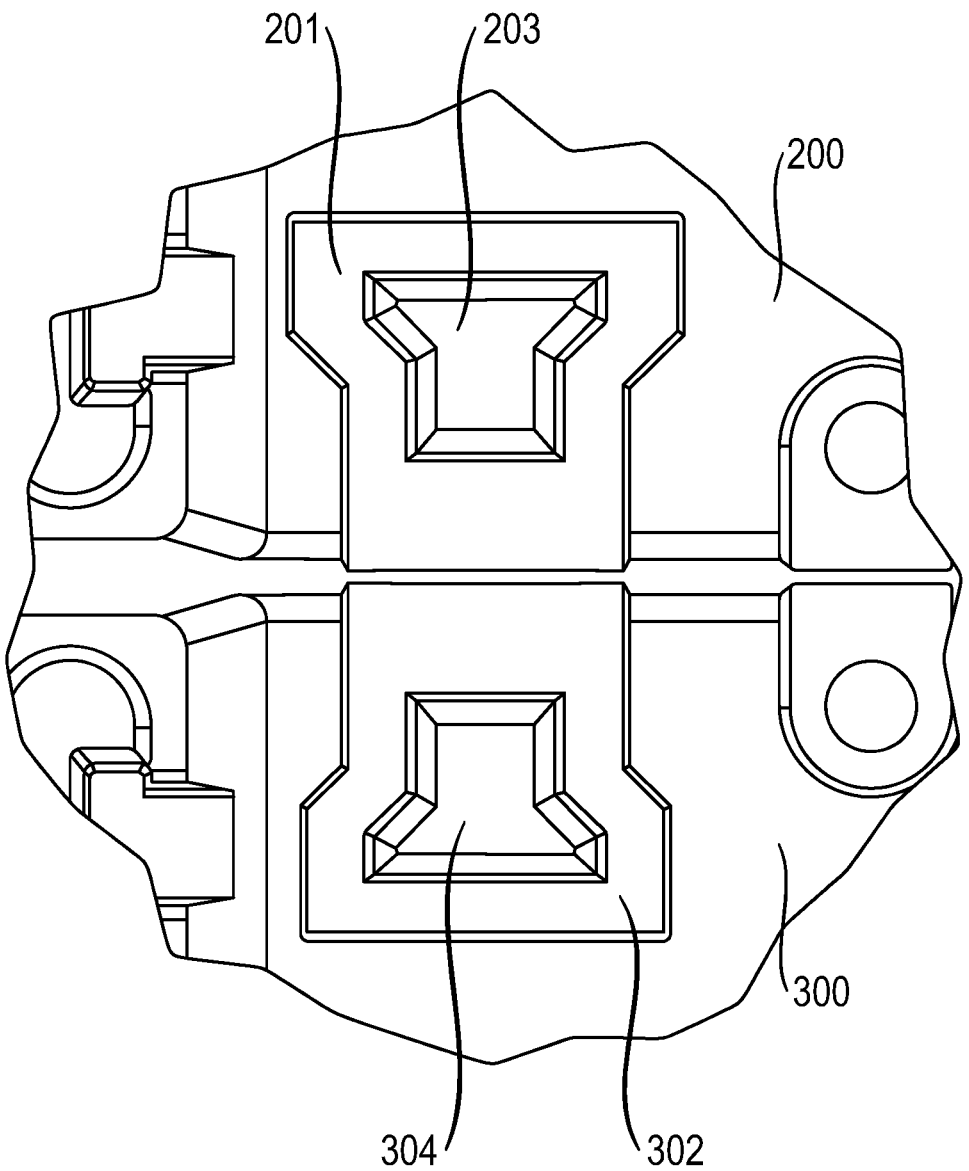
FIG. 6 shows a top view of two side-by-side indentations in the housing exteriors of two adjacent battery modules.
Figure 7:
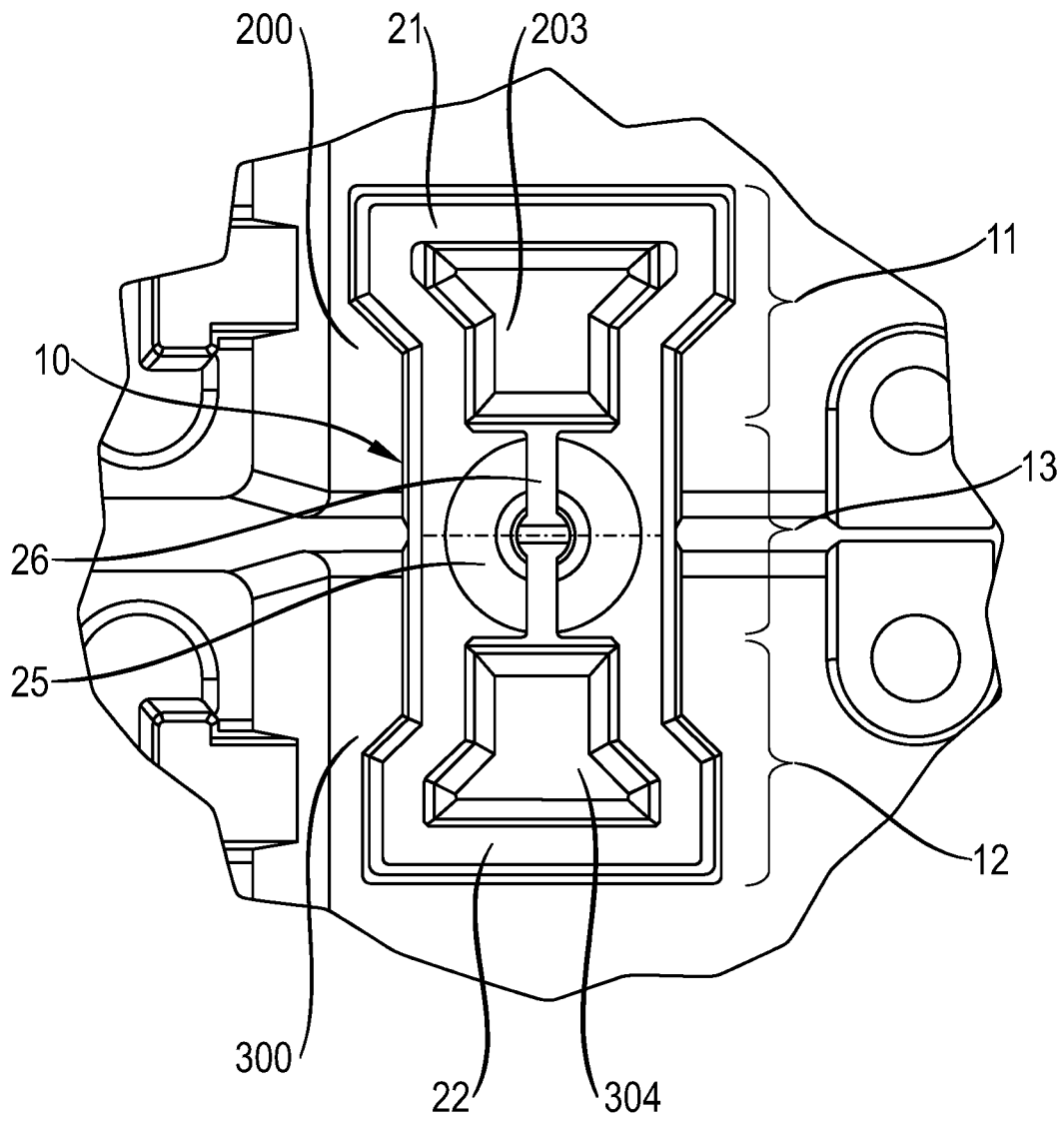
FIG. 7 shows a top view of two side-by-side indentations in the housing exteriors of two adjacent battery modules comprising an inserted connecting element.

FIG. 6 shows a top view of the marginal indentations in the housing exteriors of two side-by-side battery modules 200 and 300. FIG. 7 shows the battery modules 200 and 300 with the connecting element 10 inserted. The marginal indentations 201 and 302 are distinguished in particular by the elevations 203 and 304 present, the shape of which elevations matches to that of the webs 21 and 22 which form the end pieces 11 and 12 of the connecting element 10 and which each define a central free space within the end pieces 11 and 12, and so the elevations 203 and 304 can engage in the corresponding free spaces of the connecting element 10. The elevations 203 and 304 form anchor points for the end pieces 11 and 12 of the connecting element 10 when the lateral legs of the middle piece 13 of the connecting element 10 are pressed apart by the insertion of an expansion means, in particular a screw, into the middle piece 13 and, as a result, shortening of the connecting element 10 occurs. The shortening of the connecting element 10 that occurs pulls the modules 200, 300 closer together. This brings about further stabilization and desired alignment of the side-by-side battery modules 200, 300.

The height of the elevations 203 and 304 within the indentations 201 and 302 is preferably adapted to the height of the connecting element 10, and so, in the assembled state, the top side of the connecting element 10 is approximately on the same level as the top side of the elevations 203 and 304.

The invention claimed is:

1. A battery comprising at least two battery modules held together via at least one connecting element, the battery comprising:
   a. a first battery module having a housing having at least one first marginal indentation on a housing exterior; and
   b. a second battery module having a housing having at least one second marginal indentation on a housing exterior; wherein
   c. the at least one connecting element holding the battery modules together comprises a first end piece-and a second end piece and a middle piece connecting the two end pieces;
   d. the first end piece is in the form of a holding means and form-fittingly engages in the first marginal indentation of the first battery module;
   e. the second end piece is in the form of a holding means and form-fittingly engages in the second marginal indentation of the second battery module; and
   f. an expansion element arranged in the middle piece, the expansion element being configured to expand the connecting element such that the first and second end pieces are more tightly fixed in the first and second indentations.

2. The battery as claimed in claim 1, wherein at least one of:
   a. the housing exteriors of the battery modules having the marginal indentations are aligned parallel to one another and directly adjoin one another;
   b. the first marginal indentation comprises at least one undercut that interacts with the first end piece in the form of a holding means; and
   c. the second marginal indentation comprises at least one undercut that interacts with the second end piece in the form of a holding means.

3. The battery as claimed in claim 1, wherein at least one of:
   a. the first end piece and the second end piece of the connecting element differ in their size, and b. the first end piece and the second end piece of the connecting element differ in their shape.

4. The battery as claimed in claim 1, wherein:
   a. the first end piece and/or the second end piece of the connecting element have a dovetail-shaped cross section, and
   b. the connecting element is connected to the first and the second battery module via a dovetail connection in each case.

5. The battery as claimed in claim 1, wherein:
   the first end piece and/or the second end piece of the connecting element are each formed by an encircling web.

6. The battery as claimed in claim 1, wherein:
   the first end piece and/or the second end piece of the connecting element have recesses for engaging a manipulation means.

7. The battery as claimed in claim 6, wherein:

the first end piece and/or the second end piece of the connecting element are each formed by an encircling web having a top side and a bottom side and the recesses are arcuate recesses on the bottom side of the webs.

8. The battery as claimed in claim 1, wherein:

the middle piece of the connecting element has a gap in the longitudinal direction of the connecting element.

9. The battery as claimed in claim 1, wherein one of:

a. the expansion element is a screw or a self-tapping countersunk screw, or b. the expansion element is a conical pin.

10. The battery as claimed in claim 1, wherein at least one of:

a. the first marginal indentation of the first battery module and/or the second marginal indentation of the second battery module each have a side wall and a base, b. the base of the first marginal indentation and/or the second marginal indentation comprises an elevation spaced from the side wall, and c. the elevation is designed for preferably form-fitting engagement in the first end piece and/or in the second end piece of the connecting element.

11. The battery as claimed in claim 1, wherein at least one of:

a. the connecting element consists of plastic, or b. the connecting element is an injection-molded part.

12. A method of producing a battery having at least two battery modules comprising:

a. providing a first battery module having a housing having at least one first marginal indentation on a housing exterior, b. providing a second battery module having a housing having at least one second marginal indentation on a housing exterior, and c. providing at least one connecting element having a first end piece and a second end piece and a middle piece connecting the two end pieces, wherein d. the first battery module and the second battery module are aligned such that the housing exteriors of the battery modules having the marginal indentations are aligned parallel to one another and the first marginal indentation of the first battery module and the second marginal indentation of the second battery module lie side by side, e. the connecting element is inserted into the side-by-side marginal indentations of the first battery module and the second battery module such that the first end piece of the connecting element engages in the first marginal indentation of the first battery module and the second end piece of the connecting element engages in the second marginal indentation of the second battery module, and f. after the connecting element has been inserted into the side-by-side marginal indentations of the battery modules, a spreading element is inserted into the middle piece of the connecting element to expand the connecting element such that the first and second end pieces are more tightly fixed in the first and second marginal indentations.

13. The battery as claimed in claim 1, wherein the housing exteriors of the battery modules having the marginal indentations are aligned parallel to one another and directly adjoin one another, and between the first battery module and the at least one connecting element and between the second battery module and the at least one connecting element, there is a form fit perpendicular to the parallel housing exteriors of the battery modules.

14. The battery as claimed in claim 10, wherein the base of the first marginal indentation and/or the second marginal indentation comprises an elevation spaced from the side wall.

15. The battery as claimed in claim 14, wherein the elevation is designed for preferably form-fitting engagement in the first end piece and/or in the second end piece of the connecting element.

16. The battery of claim 1, wherein the expansion means comprises an expansion screw, a conical expansion pin, or an equivalent expansion member.

* * * * *